United States Patent
Ekici et al.

(10) Patent No.: US 10,631,364 B2
(45) Date of Patent: Apr. 21, 2020

(54) MULTI-MODE MOBILE DEVICE BASED RADIO ACCESS NETWORK SELECTION METHOD FOR IDLE MODE OPERATIONS

(71) Applicant: BlackBerry Limited, Waterloo (CA)

(72) Inventors: Ozgur Ekici, Escondido, CA (US); Muhammad Khaledul Islam, Ottawa (CA); Dimitrios Prodanos, Ottawa (CA)

(73) Assignee: BlackBerry Limited, Waterloo (CA)

( * ) Notice: Subject to any disclaimer, the term of this patent is extended or adjusted under 35 U.S.C. 154(b) by 124 days.

(21) Appl. No.: 14/822,520

(22) Filed: Aug. 10, 2015

(65) Prior Publication Data

US 2015/0351025 A1 Dec. 3, 2015

Related U.S. Application Data

(63) Continuation of application No. 13/956,633, filed on Aug. 1, 2013, now Pat. No. 9,107,241, which is a
(Continued)

(51) Int. Cl.
| | |
|---|---|
| *H04W 88/06* | (2009.01) |
| *H04W 72/02* | (2009.01) |
| *H04W 48/18* | (2009.01) |
| *H04W 76/28* | (2018.01) |
| *H04W 76/27* | (2018.01) |

(52) U.S. Cl.
CPC .......... *H04W 88/06* (2013.01); *H04W 48/18* (2013.01); *H04W 72/02* (2013.01); *H04W 76/28* (2018.02); *H04W 76/27* (2018.02)

(58) Field of Classification Search
CPC ..... H04W 88/06; H04W 88/10; H04W 36/14; H04W 36/0022; H04W 48/18; H04W 76/048; H04W 76/046; H04W 76/025; H04W 48/16; H04W 48/20; H04W 76/026; H04W 36/28; H04W 72/02; H04W 52/02; H04W 76/27; H04W 76/28; H04W 76/16; H04W 76/15; H04W 88/02; H04W 60/005; Y02D 70/24; Y02D 70/00
See application file for complete search history.

(56) References Cited

U.S. PATENT DOCUMENTS

| | | | |
|---|---|---|---|
| 5,799,256 | A | 8/1998 | Pombo et al. |
| 6,978,138 | B2 | 12/2005 | Japenga et al. |
| (Continued) | | | |

FOREIGN PATENT DOCUMENTS

| | | |
|---|---|---|
| EP | 2288226 A1 | 2/2011 |
| WO | 2007110138 A1 | 10/2007 |

OTHER PUBLICATIONS

Canadian Intellectual Property Office, Office Action for Application No. 2905137, dated Sep. 19, 2016.
(Continued)

*Primary Examiner* — Ricardo H Castaneyra
(74) *Attorney, Agent, or Firm* — Moffat & Co

(57) ABSTRACT

A method at a mobile device, and the mobile device, the method selecting a subset of radio access technologies available to the mobile device over which a predetermined set of services on the mobile device is available; and deactivating monitoring, or reducing a monitoring frequency, of at least one radio access technology not within the selected subset of radio access technologies.

18 Claims, 5 Drawing Sheets

Related U.S. Application Data continuation of application No. 13/205,369, filed on Aug. 8, 2011, now Pat. No. 8,527,001.

(56) References Cited

U.S. PATENT DOCUMENTS

| | | | |
|---|---|---|---|
| 8,223,685 | B2 | 7/2012 | Baglin et al. |
| 8,391,918 | B2 | 3/2013 | Ekici et al. |
| 8,903,382 | B2 | 12/2014 | Swaminathan et al. |
| 8,934,460 | B1 | 1/2015 | Hu et al. |
| 2004/0116110 | A1 | 6/2004 | Amerga et al. |
| 2005/0136898 | A1* | 6/2005 | Shaheen ............... H04W 88/06 455/414.1 |
| 2008/0113692 | A1 | 5/2008 | Zhao et al. |
| 2008/0220772 | A1 | 9/2008 | Islam et al. |
| 2009/0068969 | A1 | 3/2009 | Lindoff et al. |
| 2009/0104907 | A1* | 4/2009 | Otting ................... H04W 48/10 455/435.3 |
| 2009/0268654 | A1 | 10/2009 | Baglin et al. |
| 2010/0234042 | A1* | 9/2010 | Chan ................ H04W 36/0061 455/453 |
| 2010/0331034 | A1* | 12/2010 | Ishii ..................... H04W 48/18 455/517 |
| 2011/0130150 | A1 | 6/2011 | Kolding et al. |
| 2011/0170481 | A1 | 7/2011 | Gomes et al. |
| 2011/0237231 | A1 | 9/2011 | Horneman et al. |
| 2012/0269173 | A1* | 10/2012 | Chin ..................... H04W 68/12 370/332 |
| 2013/0102313 | A1* | 4/2013 | Tinnakornsrisuphap ................... H04W 36/22 455/436 |
| 2014/0146732 | A1 | 5/2014 | Olufunmilola et al. |

OTHER PUBLICATIONS

European Patent Office, Extended European Search Report on EP Application No. 11176841.2, dated Jan. 19, 2012.
3rd Generation Partnership Project, 3GPP TS 43.318, Technical Specification Group GSM/EDGE Radio Access Network; Generic Access Network; Stage 2 (Release 10), Mar. 2011.
Yaw Nkansah-Gyekye and Johnson I. Agbinya, "Vertical Handoffs in Fourth Generation Wireless Networks" ,http://services.eng.uts.edu.au/~agbinya/book/Paper14.doc>, Jan. 2008.
European Patent Office, European Search Report on EP Application No. 11176841.2, dated Nov. 23, 2012.
European Patent Office, European Search Report on EP Application No. 11176841.2, dated May 14, 2013.
Canadian Intellectual Property Office, Office Action for Application No. 2905137, dated Apr. 27, 2017.
Canadian Intellectual Property Office, Office Action for Application No. 2,905,137, dated Mar. 21, 2018.
Canadian Intellectual Property Office, Office Action for Application No. 2,905,137, dated Feb. 28, 2019.
European Patent Office, extended European search report for Application No. 19190587.6, dated Jan. 2, 2020.
Canadian Intellectual Property Office, Office Action for Application No. 2,905,137, dated Jan. 31, 2020.

* cited by examiner

MULTI-MODE MOBILE DEVICE BASED RADIO ACCESS NETWORK SELECTION METHOD FOR IDLE MODE OPERATIONS

FIELD OF THE DISCLOSURE

The present disclosure relates generally to multi-mode mobile devices, and more particularly, to radio access network selection on a multi-mode mobile device.

BACKGROUND

Multi-mode mobile devices can support and connect to multiple radio access technologies simultaneously. Examples of radio access technologies include, but are not limited to Global System for Mobile Communication (GSM), Code Division Multiple Access (CDMA), Universal Mobile Telecommunication System (UMTS)/Wideband Code Division Multiple Access (WCDMA), CDMA2000 1x and 1xEV-DO, Long Term Evolution (LTE), Long Term Evolution—Advanced (LTE-A), among others. In addition to these radio access technologies which operate on licensed spectrum and are typically known as cellular radio access technologies, a multi-mode mobile device may support variants of IEEE 802.x-based radio access technologies such as WiFi, WiMAX, and provide Wireless Local Area Network (WLAN) service on unlicensed spectrum. A multi-mode mobile device may also communicate through short range wired or wireless communications such as IrDA, Bluetooth™, near field communications (NFC), Universal Serial Bus (USB), amongst others. Moreover, a multi-mode mobile device capable of supporting Unlicensed Mobile Access (UMA) can roam and handover between cellular and WLAN radio access technologies.

When a multi-mode mobile device is in a coverage area of multiple radio access networks, the mobile device may register with more than one, provided that the corresponding radio access technology at the device is turned on and active. Current radio technology standards require the multi-mode mobile device to monitor all of the radio access networks to which it is registered.

As used herein, a multi-mode mobile device that is not performing an active data transfer is said to be operating in IDLE mode. In IDLE mode, the device performs discontinuous reception (DRX) where it periodically turns on its receiver to listen for possible "paging", "beacon", or similar messages indicating the presence of incoming voice or data calls. When not listening for incoming calls, the device deactivates its receiver to conserve battery life. The use of the term IDLE in the present disclosure includes states in certain radio access technologies that are considered connected, such as within UMTS when the device is in a Cell_PCH or URA_PCH state.

With the evolution in wireless technology, services such as voice, short message service (SMS), emergency call, and/or other applications may all be supported by different radio access technologies. It is possible that a multi-mode mobile device may be able to obtain all the subscribed services from one or more radio access technologies to which the mobile device is capable of connecting. However, a multi-mode mobile device is still required to wake up periodically to listen to paging/beacon messages from all the radio access networks to which it is registered. This monitoring of multiple networks decreases the already limited battery life of a multi-mode mobile device.

BRIEF DESCRIPTION OF THE DRAWINGS

The present disclosure will be better understood with reference to the drawings, in which.

DETAILED DESCRIPTION

The present disclosure provides a method at a mobile device comprising: selecting a subset of radio access technologies available to the mobile device over which a predetermined set of services on the mobile device is available; and deactivating monitoring, or reducing a monitoring frequency, of at least one radio access technology not within the selected subset of radio access technologies.

The present disclosure further provides a mobile device, comprising, a processor; and a communications subsystem, wherein the processor and communications subsystem cooperate to: select a subset of radio access technologies available to the mobile device over which a predetermined set of services on the mobile device is available; and deactivate monitoring, or reduce a monitoring frequency, of at least one radio access technology not within the selected subset of radio access technologies.

Advantageously, by selecting a radio access network that offers all the required services subscribed for a multi-mode mobile device for idle mode operations, or by selecting radio access networks each offering a subset of the required services and together providing all the services required, redundant monitoring of paging/beacon messages from all other supported radio access technologies can be avoided. In one embodiment, this may be achieved by turning on access mode(s) of the mobile device to the radio access technology or radio access technologies selected for IDLE mode operations and turning off access modes to all other supported radio access technologies.

In another embodiment, by reducing the discontinuous reception (DRX) cycle of all other supported radio access technologies that have not been selected for IDLE mode operations, the frequency of redundant independent monitoring can be reduced. This reduces current consumption of the multi-mode mobile device during idle mode operations.

The term "mobile device", as used herein, could be any wireless device, including, but not limited to a mobile station, user equipment (UE), personal digital assistant, data enabled cellular telephone, pager, laptop, among others.

The term access point (AP), as used herein, indicates a wireless service point and may include a node B, evolved node B (eNB), home evolved node B (HeNB), a base station or relay in WiMAX, an access point in 802.11 or any such similar wireless service point. The present disclosure is not limited to any particular type of access point.

Figure 1:
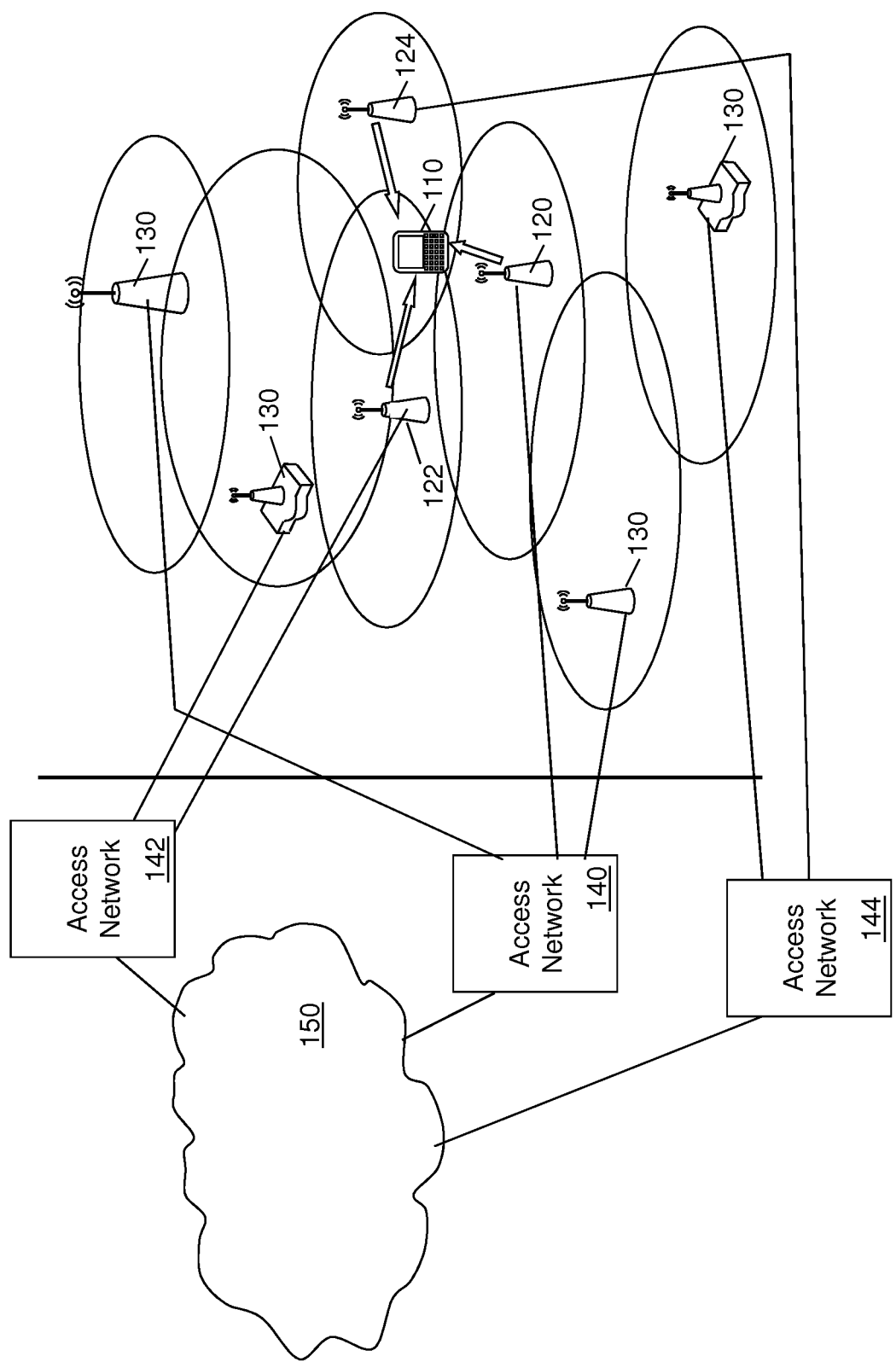
FIG. 1 is an exemplary communication environment in which a multi-mode mobile device and method in accordance with one embodiment may be practiced.

Reference is now made to FIG. 1, which shows an exemplary system model in which a mobile device 110 communicates with a plurality of access points. In the example of FIG. 1, mobile device 110 is capable of communicating with access points 120, 122 and 124. For example, in the embodiment of FIG. 1, access point 120 may be a UMTS access point, access point 122 may be a WiFi access point, and access point 124 may be an LTE access point. However, this is not limiting and other examples would be evident to those in the art having regard to the present disclosure. Further, if mobile device 110 is a multi-mode device it could communicate with a plurality of access points 120, 122, and 124 at the same time, provided they are of RAT types supported by the multi-mode device.

Access points 130 provide communication in separate areas for which the mobile device is currently not capable of communicating due to coverage area.

Access point 120, may interact with an access network 140, access point 122 may interact with access network 142 and access point 124 may interact with access network 144 in the embodiment of FIG. 1. Each access network 140, 142 and 144 may further interact with Internet 150.

As a mobile device 110 moves between cells, access points 120, 122, 124 and 130 may provide better or worse signal quality for mobile device 110, and thus the access point serving mobile device 110 may change. Further, signal quality may change based on other mobile devices within a cell, interference from other sources, among other factors. Further, a decision to monitor a specific access point may be based on data rates, cost for data, among other factors.

As indicated in the system model of FIG. 1, a plurality of access networks 140, 142, and 144 may exist and the mobile device 110 may need to register with each of the plurality of access networks 140, 142, and 144 in order to receive voice and data calls. The access points 120, 122, 124 and 130 will each interact with an access network.

Further, the model of FIG. 1 does not show the content providers, such as web servers, enterprise servers or others, that may provide data through an access network 140.

In accordance with the embodiment of FIG. 1, mobile device 110 is said to be in IDLE mode when it has no active data connection. In IDLE mode, mobile device 110 must wake up periodically to monitor data activities. For example, if mobile device 110 is concurrently connected to a WCDMA network with access point 120 and a WiFi (WLAN) network with access point 122, it will need to monitor both networks independently. More specifically, mobile device 110 needs to wake its WCDMA receiver up to monitor the paging indicator channel (PICH) of WCDMA and to wake its WLAN receiver up to monitor beacon messages of WLAN every DRX period. In one configuration, the DRX period is typically 1.28 seconds for WCDMA and 100 ms for WLAN.

TABLE 1

Comparison of Current Consumption of a Multi-mode Mobile Device Operating in IDLE Mode

| Radio Access Technology | IDLE mode current consumption (mA) | Current consumption increase with respect to WiFi only (%) |
|---|---|---|
| 2G + WiFi | 7.367 | 10.235 |
| 3G + WiFi | 9.266 | 38.650 |
| WiFi | 6.683 | 0 |

Reference is now made to Table 1, which shows a comparison of current consumption of a multi-mode mobile device operating in IDLE mode. More specifically, Table 1 shows the increase in battery consumption when a multi-mode mobile device monitors cellular networks in addition to monitoring a WLAN network during IDLE mode operations.

The first entry shows that current consumption is 7.367 mA when the mobile device monitors a 2G radio access technology such as GSM/GPRS in addition to monitoring a WiFi technology. This represents an increase of approximately 10% compared to a mobile device that monitors only WiFi during IDLE mode operations. The second entry shows that current consumption is increased by approximately 40% if paging messages of a 3G network such as that for a WCDMA network are monitored in addition to monitoring a WiFi network.

This independent monitoring by a multi-mode mobile device of all supported and connected radio access networks in a coverage area of multiple radio access technologies drains the battery of the mobile device.

If a multi-mode mobile device stops listening to the paging channel of a cellular network in a coverage area that also has WLAN coverage, then the mobile device battery life can be conserved.

Figure 2:
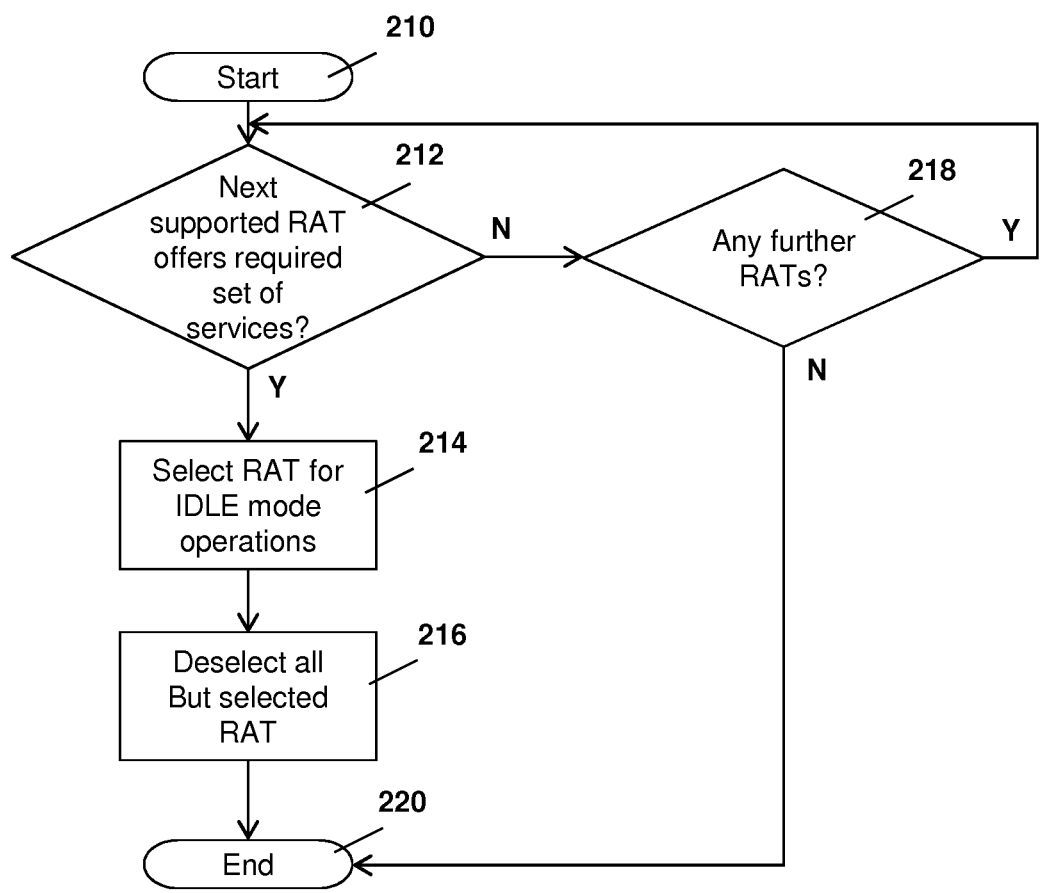
FIG. 2 is a process diagram illustrating a radio access network selection method for idle mode operations in accordance with one embodiment.

Reference is now made to FIG. 2, which shows an embodiment of a method for selecting a radio access network for idle mode operations of a multi-mode mobile device requiring a set of services in a coverage area of a plurality of radio access technologies (RATs) to which the mobile device is capable of connecting.

The multi-mode mobile device may be aware of the services offered by each supported radio access network. This information may be pre-configured and stored on the device during manufacturing or it may be configured by network carriers or the device user. In another embodiment, the mobile device may dynamically query a supported radio access network for this information. Those skilled in the art will appreciate that other options may be used to enable the mobile device to determine what services each supported radio access network offers.

In one embodiment, a mobile device may be configured such that a certain radio access technology, if available, is prioritized over other supported radio access technologies to provide certain types of service. For example, WLAN technology may be prioritized over GSM to provide data services to a multi-mode mobile device in an area that has both WLAN and GSM coverage.

In another embodiment, services subscribed for a multi-mode mobile device such as voice, SMS, emergency calls, electronic mail, audio and/or video streaming, social networking, RSS feeds, internet browsing, and/or other applications may be configurable by a device user. A user interface may be provided on the mobile device for the device user to specify the subset of subscribed services that are mandatory or essential.

Further, other factors such as time of day may be used to determine which services are required. For instance, the device user may specify all subscribed services as mandatory during business hours while selecting only certain data applications as mandatory and circuit-switched voice calls as optional during the evening hours. These examples are for illustrative purposes only and are not meant to be limiting.

Different user profiles may be set up on the mobile device to specify the types of service the device user requires based on the time of day or other configurable parameters. A mobile device may also have multiple user accounts, each having one or more user profiles. Those skilled in the art will appreciate that different ways of providing device user(s) with the flexibility of configuring the mobile device are possible.

The process of FIG. 2 starts at block 210 and proceeds to block 212 in which the multi-mode mobile device checks one of the plurality of supported and connected radio access technologies to determine whether one offers the required set of services. The check may prioritize radio access technologies in one embodiment, such that a most desired RAT may be checked first. Thus, in the embodiment of FIG. 2, all currently activated RATs are checked in turn and one selected for IDLE mode while others are deselected. In an alternative embodiment, not shown, each RAT is activated in turn until the required services are covered.

In one embodiment, the required set of services consists of all the services subscribed for the mobile device. In another embodiment, the set of services are all the subscribed services that are configured as mandatory or essential for the mobile device. The set of services configured as mandatory may depend on other parameters such as the time of day and the like as described previously. In yet another embodiment, the required set of services is the set of mandatory services configured for a chosen profile on the mobile device or the set of mandatory services configured for a chosen profile of an active user account on the mobile device.

If the radio access technology is found to offer the required set of services at block 212, then the process proceeds to block 214 where the radio access technology found in block 212 that offers the set of required services is selected for IDLE mode operations.

From block 214, the process then proceeds to block 216 where all other supported radio access technologies that have not been selected for IDLE mode operations are deselected. Deselecting may comprise turning off access modes of the mobile device to these radio access technologies. This stops the mobile device from monitoring paging/beacon messages from all other radio access technologies that have not been selected for IDLE mode operations. Alternatively, deselecting may comprise reducing a DRX cycle of these radio access technologies to decrease the frequency of monitoring the paging/beacon messages of all radio access technologies that have not been selected for IDLE mode operations. From block 216, the process then ends at block 220.

On the other hand, at block 212, if the radio access technology does not offer the set of required services, the process proceeds to block 218 to determine if there is any supported radio access technology that has not yet been checked. If yes, the process loops back to block 212 again where the next supported radio access technology that has not yet been checked is checked to determine if it offers the set of required services. This process repeats itself until a supported radio access technology is found to offer the set of required services, in which case, the process proceeds to block 214 as previously described. In other words, block 212 stops checking all other supported radio access technologies once a radio access technology is found to offer the set of required services. However, at block 218, if it is determined that all the supported radio access technologies have already been checked and none of the supported radio access technologies offers the set of required services, then the process continues to block 220 where the process ends. In this case, the device will continue to monitor all of the connected RATs.

Figure 3:
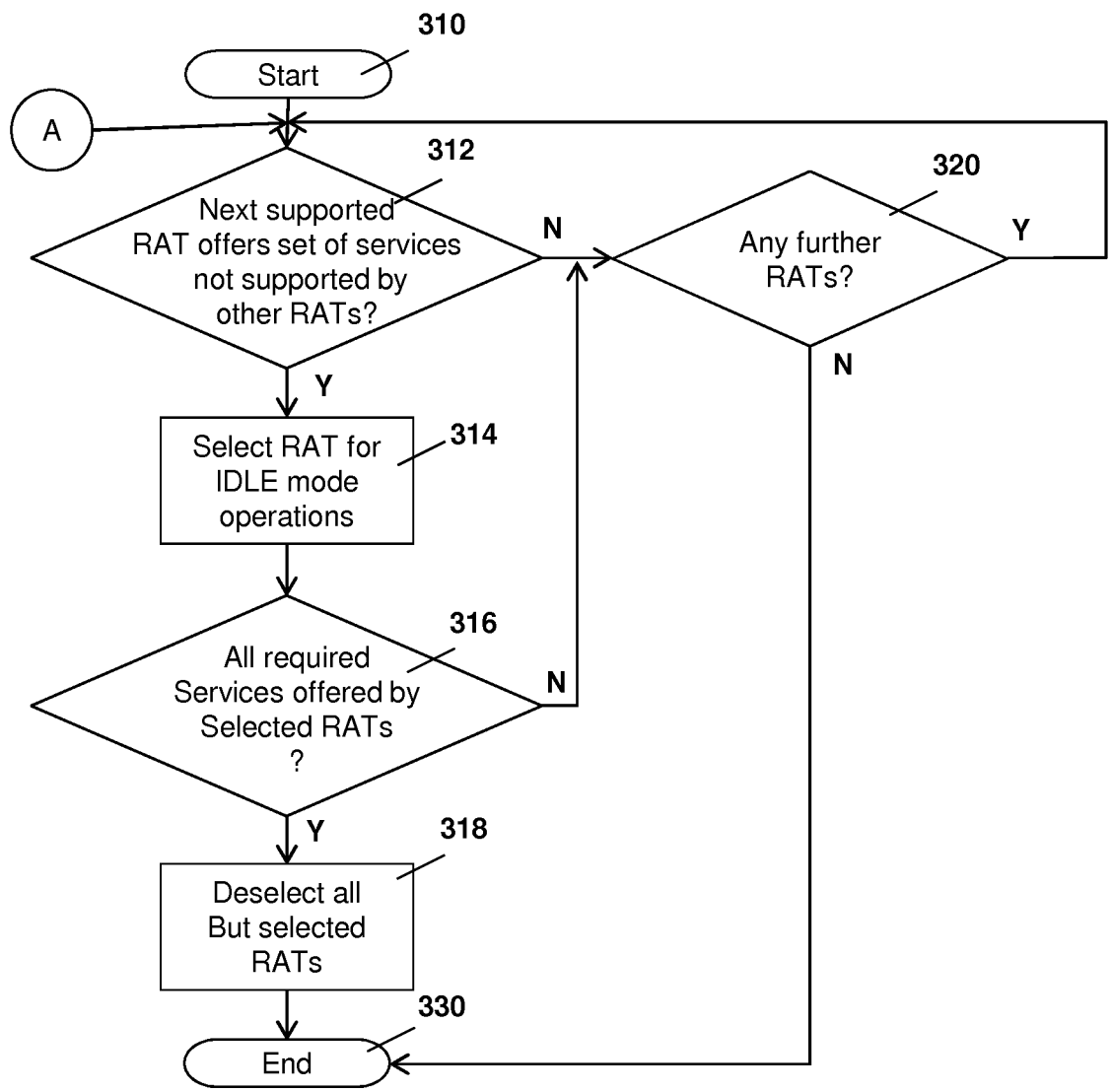
FIG. 3 is a process diagram illustrating a radio access network selection method for idle mode operation in accordance with an alternative embodiment.

In another embodiment, as shown in FIG. 3, a method is provided for selecting a radio access network for IDLE mode operations of a multi-mode mobile device requiring a set of services in a coverage area of a plurality of radio access technologies.

In the method described in FIG. 3, if only a subset of the required services is offered by a radio access technology, that radio access technology is selected for IDLE mode operations. The process continues to check the next supported radio access technology that offers the remainder or a subset of the remainder of the required services, until all the required services are found to have been offered by one or more radio access technologies that have been selected for IDLE mode operations or until all the supported radio access technologies have been checked.

The process of FIG. 3 starts at block 310 and proceeds to block 312 in which the multi-mode mobile device checks one of the plurality of radio access technologies to determine whether it offers one or more required services. The check at clock 312 may check whether the service required has been covered by a previously selected RAT, in which case the RAT being checked is only selected if it offers a service not offered by the previously selected RAT.

If the check at block 312 results in a determination that the RAT adds a service not offered by a previously selected RAT, the radio access technology is selected for IDLE mode operations at block 314. Selecting the radio access technology for IDLE mode operations at block 314 may comprise turning on an access mode of the mobile device to the selected radio access technology if the access mode has not already been turned on.

The process then proceeds to block 316 to determine if all the required services are offered by one or more radio access technologies that have been selected for IDLE mode operations. If yes, the process proceeds to block 318 where at least one supported radio access technology that has not been selected for IDLE mode operations is deselected. In some cases all of the supported radio access technologies not selected for idle mode can be deselected. In other cases, some of the supported radio access technologies not selected for IDLE mode may be kept on. Deselecting may comprise turning off access modes of the mobile device to these radio access technologies, or reducing the DRX cycle of these radio access technologies that have not been selected for IDLE mode operations. The process then ends at block 330.

At block 312, if the radio access technology does not offer one or more required services above those offered by previously selected radio access technologies, then the process proceeds to block 320.

Similarly, at block 316, if all the required services are not offered by the selected radio access technologies, the process proceeds to block 320.

At block 320, if there is any supported radio access technology that has not yet been checked, then the process loops back to block 312 where the next supported radio access technology that has not yet been checked is checked to determine if it offers one or more required services that are not offered by any of the radio access technologies that have been selected for IDLE mode operations. This process repeats itself until: (a) a supported radio access technology is found to offer all the remaining required services or a subset of the remaining required services, in which case, the process proceeds to block 314 as previously described, or (b) all the supported radio access technologies have been checked. In the latter case, if all the supported radio access technologies have been checked, the process then proceeds from block 320 to block 330 and ends.

The embodiment of FIG. 3 is merely meant to be illustrative. Other methods for finding the minimum number of RATS would be equally applicable. Further, in some embodiments, it may be sufficient to find a combination of RATs that offers a subset of currently active RATs, even if such subset is not the minimally sized subset and thus not an exhaustive solution.

Considering a multi-mode mobile device supporting both WLAN and cellular technologies in an overlapping coverage area of both WLAN and cellular networks. If the mobile device only requires data services, the data tunnel of WLAN maybe prioritized over cellular technologies for cost and bandwidth or performance reasons. Such data tunnel management implementation is profitable to network operators because traffic can be offloaded from the limited, licensed and cellular network bandwidth to wider, free and unlicensed WLAN bandwidth. It is also valuable to the mobile device user as the connection over WLAN is usually cheaper, if not free, and the bandwidth is much higher compared to that in a cellular network.

Despite the common practice of prioritized tunnel implementation over WLAN, multi-mode mobile devices requiring only data services, according to the current practice, are still required to wake up periodically to listen to paging/beacon messages from all the connected and registered radio access networks. This independent monitoring of all networks drains the battery of the mobile device. It consumes power and reduces battery life of the mobile device.

In one embodiment, different priority schemes may be provided on the mobile device for the different services. These priority schemes on the mobile device may be configured by device users, network carriers and/or or service providers.

For example, considering a multi-mode mobile device supporting WLAN, UMTS and GSM technologies in an overlapping coverage area of both WLAN and cellular networks which requires both data services and circuit-switched voice services. The priority scheme may be set up such that data tunnel of WLAN is always prioritized over cellular networks for data services even though cellular networks offer both data services and circuit-switched voice call services. The priority scheme may further provide that UMTS is prioritized over GSM for circuit-switched voice call services. In that case, access modes of the mobile device to WLAN and UMTS may be turned on for IDLE mode operations, while access mode to GSM may be turned off to reduce battery consumption.

Those skilled in the art will appreciate that various priority schemes may be set up for cost, bandwidth, performance or other reasons.

Figure 4:
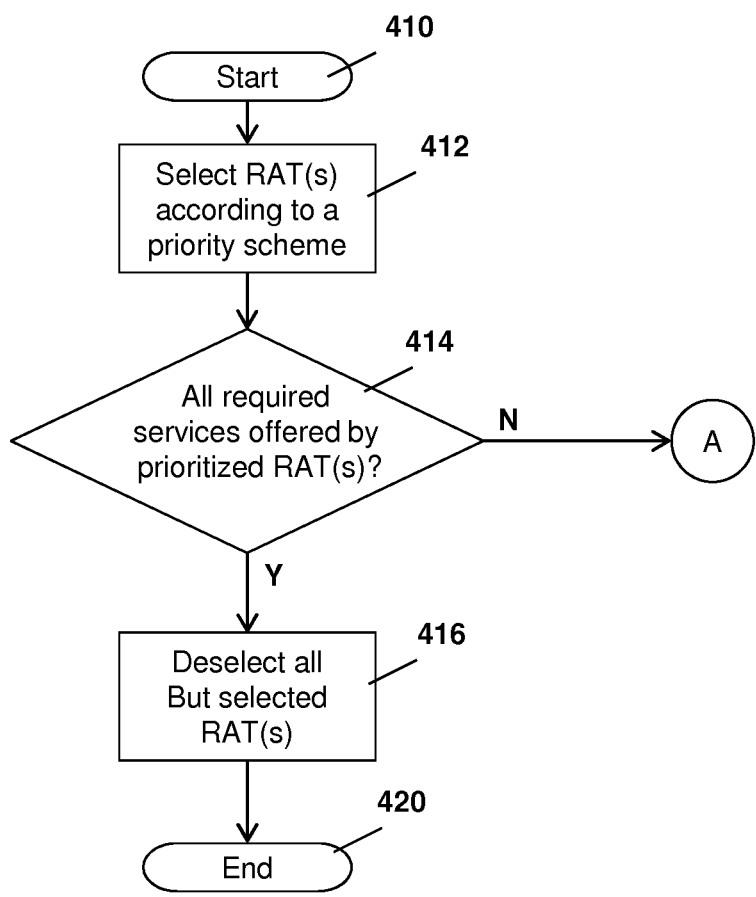
FIG. 4 is a process diagram illustrating a radio access network selection method for idle mode operation in accordance with yet another embodiment.

Another embodiment of the present method is provided in FIG. 4 where supported radio access technologies will always be selected for IDLE mode operations based on a priority scheme for the required set of services. The prioritized radio access technologies are considered first to determine whether all the required services are offered by one or more of the selected prioritized radio access technologies. If not, the less prioritized radio access technologies will then be considered.

For example, if a subset of the required services is offered by a prioritized radio access technology, then that prioritized radio access technology is selected for IDLE mode operations. The process then continues to check the next prioritized radio access technology that offers the remainder or a subset of the remaining required services, until all the prioritized radio access technologies that have been selected for IDLE mode operations together offer all the required services. If after checking all the prioritized radio access technologies, and not all the required services are offered by the selected prioritized radio access technologies, the process proceeds to checking the less prioritized radio access technology or technologies to determine if any of them offers the remainder or a subset of the remaining required services, until all the supported radio access technologies that have been selected for IDLE mode operations together offer all the required services or until all the supported radio access technologies have been checked.

Referring to FIG. 4, the process starts at block 410 and proceeds to block 412, where radio access technologies are selected in accordance to a priority scheme. Selecting a radio access technology for IDLE mode operations in block 412 may comprise turning on an access mode of the mobile device to a selected prioritized radio access technology if the access mode has not already been turned on.

As described previously, the priority scheme may require certain prioritized radio access technology be selected all the time for certain services even though the same services may have been offered by other radio access technologies. Other priority scheme may require a prioritized radio access technology that offers all the required services or the most number of required services be selected. These examples are for illustrative purposes and are not limiting.

From block 412, the process proceeds to block 414 where a check is made to determine whether the prioritized radio access technology or technologies that have been selected for IDLE mode operations offer all required services.

At block 414, if the selected prioritized radio access technologies are found to offer all the required services, then the process proceeds to block 416 where all other radio access technologies that have not been selected for IDLE mode operations are deselected. Deselecting may comprise turning off access modes of the mobile device to these radio access technologies which stops the mobile device from monitoring paging/beacon messages from these radio access technologies. Alternatively, deselecting may comprise reducing DRX cycle of these radio access technologies to decrease the frequency of monitoring the paging/beacon messages of all the radio access technologies that have not been selected for IDLE mode operations. Based on the above, the device goes into deep sleep with respect to the less prioritized networks or with respect to the supported radio access technologies that are not selected for IDLE mode operations. From block 416, the process then ends at block 420.

If, at block 414, it is found that not all required services are offered by the one or more prioritized radio access technologies that have been selected for IDLE mode operations, then the process proceeds to block 312 of FIG. 3 where supported radio access technologies that have not yet been checked for the services that they offer are checked, and the process continues as described above with regards to FIG. 3.

Those skilled in the art will appreciate that in some embodiments, a multi-mode mobile device may have several user accounts. Each user account may have one or more user profiles, each having a different set of required services. Therefore, depending on which user account is logged on at the time and the profile that has been chosen by the device user, the multi-mode mobile device may select a different radio access network for IDLE mode operations in the same coverage area. Access modes of a multi-mode mobile device to the different radio access technologies are selectively turned on or off depending on the priority scheme (if one exists), the service offerings of the different supported radio access networks, the set of services subscribed for or specified as mandatory for a chosen user profile, or for a user account of the mobile device which is logged on at the time.

Figure 5:
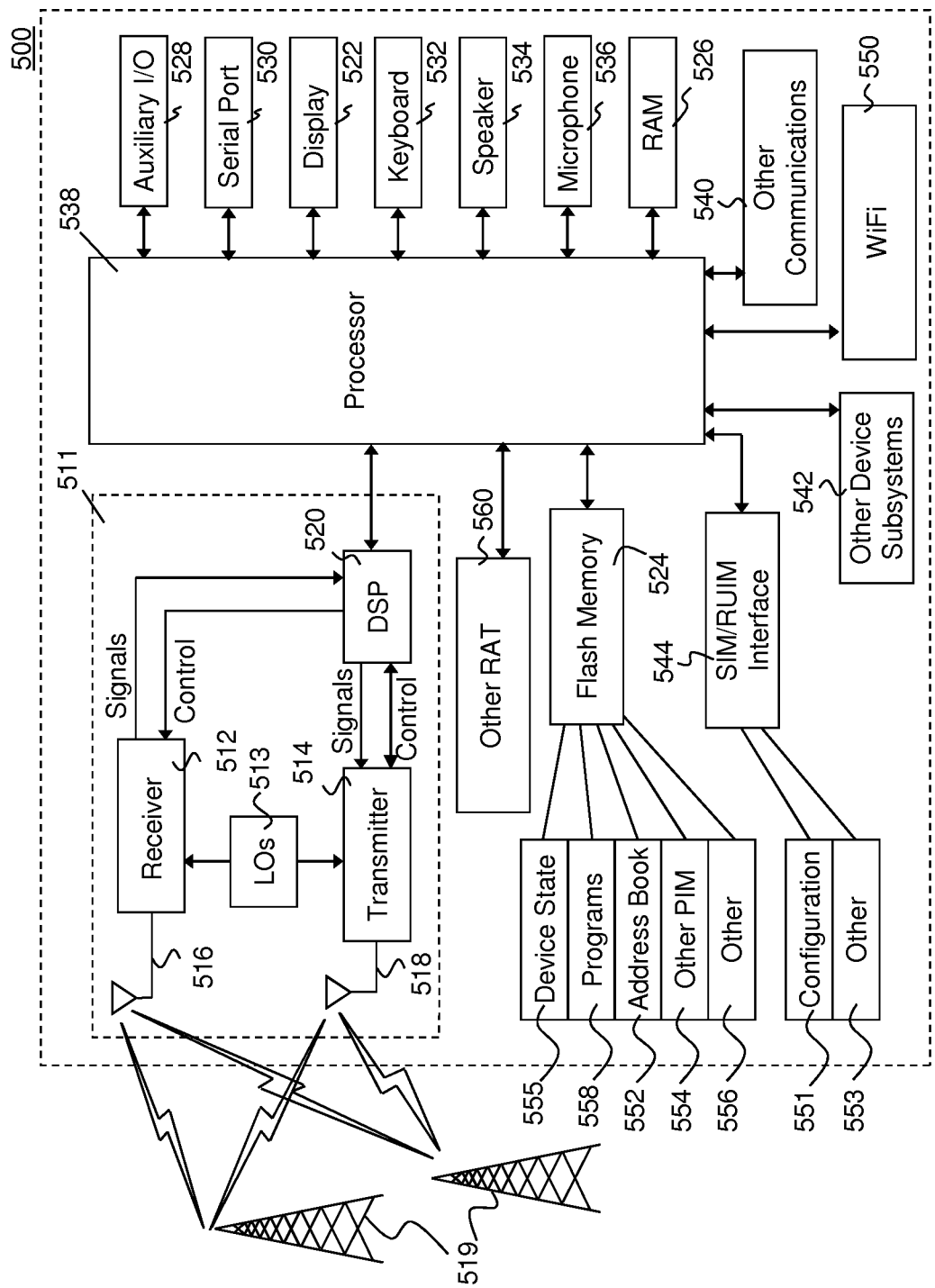
FIG. 5 is a block diagram showing an exemplary multi-mode mobile device.

An exemplary multi-mode mobile for use with the embodiments above is illustrated below with reference to FIG. 5. The multi-mode mobile device of FIG. 5 is however not meant to be limiting, but is provided for illustrative purposes. Other multi-mode mobile devices could also be used.

Multi-mode mobile device 500 is typically a two-way wireless communication device having at least voice and data communication capabilities. Multi-mode mobile device 500 may have the capability to communicate with other computer systems on the Internet. Depending on the exact functionality provided, the mobile device 500 may be referred to as a data messaging device, a two-way pager, a wireless e-mail device, a cellular telephone with data messaging capabilities, a wireless Internet appliance, a wireless device, a user equipment, or a data communication device, as examples.

Where mobile device 500 is enabled for two-way communication, it can incorporate a communication subsystem 511, including both a receiver 512 and a transmitter 514, as well as associated components such as one or more antenna elements 516 and 518, local oscillators (LOs) 513, and a processing module such as a digital signal processor (DSP) 520. In some embodiments, communication subsystem 511 may allow for communications with a plurality of RATs. In other embodiments, one or more further communications subsystem 560 supporting other RATs could be provided on mobile device 500. As will be apparent to those skilled in the field of communications, the particular design of the communication subsystem 511 or 560 will be dependent upon the communication network in which the device is intended to operate. For example, mobile device 500 may include a communication subsystem 511 designed to operate within the GPRS network or UMTS network. In some embodiments, a mobile device 500 supporting WiFi could include a further communications subsystem 550.

Network access requirements will also vary depending upon the type of network 519. For example, In UMTS and GPRS networks, network access is associated with a subscriber or user of mobile device 500. For example, a GPRS mobile device therefore requires a subscriber identity module (SIM) card in order to operate on a GPRS network. In UMTS a USIM or SIM module is required. In CDMA a removable user identity module (RUIM) card or a SIM card is required. These will be referred to as a UIM interface herein. Without a valid UIM interface, a mobile device may not be fully functional. Local or non-network communication functions, as well as legally required functions (if any) such as emergency calling, may be available, but mobile device 500 will be unable to carry out any other functions involving communications over the network 519. The UIM interface 544 is normally similar to a card-slot into which a card can be inserted and ejected like a diskette or PCMCIA card. The UIM card can hold many key configuration 551, and other information 553 such as identification, and subscriber related information.

When required network registration or activation procedures have been completed, mobile device 500 may send and receive communication signals over the network 519. Signals received by antenna 516 through communication network 519 are input to receiver 512, which may perform such common receiver functions as signal amplification, frequency down conversion, filtering, channel selection and the like, and in the example system shown in FIG. 5, analog to digital (ND) conversion. ND conversion of a received signal allows more complex communication functions such as demodulation and decoding to be performed in the DSP 520. In a similar manner, signals to be transmitted are processed, including modulation and encoding for example, by DSP 520 and input to transmitter 514 for digital to analog conversion, frequency up conversion, filtering, amplification and transmission over the communication network 519 via antenna 518. DSP 520 not only processes communication signals, but also provides for receiver and transmitter control. For example, the gains applied to communication signals in receiver 512 and transmitter 514 may be adaptively controlled through automatic gain control algorithms implemented in DSP 520.

Network 519 may further communicate with multiple systems, including a server and other elements (not shown). For example, network 519 may communicate with both an enterprise system and a web client system in order to accommodate various clients with various service levels.

Mobile device 500 can include a microprocessor 538 which controls the overall operation of the device. Communication functions, including data and voice communications, are performed through communication subsystem 511. Microprocessor 538 also interacts with further device subsystems such as the display 522, flash memory 524, random access memory (RAM) 526, auxiliary input/output (I/O) subsystems 528, serial port 530, keyboard 532, speaker 534, microphone 536, a short-range communications subsystem 540 and any other device subsystems generally designated as 542.

Some of the subsystems shown in FIG. 5 perform communication-related functions, whereas other subsystems may provide "resident" or on-device functions. Notably, some subsystems, such as keyboard 532 and display 522, for example, may be used for both communication-related functions, such as entering a text message for transmission over a communication network, and device-resident functions such as a calculator or task list.

Operating system software used by the microprocessor 538 may be stored in a persistent store such as flash memory 524, which may instead be a read-only memory (ROM) or similar storage element (not shown). Those skilled in the art will appreciate that the operating system, specific device applications, or parts thereof, may be temporarily loaded into a volatile memory such as RAM 526. Received communication signals may also be stored in RAM 526. Further, a unique identifier is also preferably stored in read-only memory.

As shown, flash memory 524 can be segregated into different areas for both computer programs 558 and program data storage 555, 552, 554 and 556. These different storage types indicate that each program can allocate a portion of flash memory 524 for their own data storage requirements. Microprocessor 538, in addition to its operating system functions, may enable execution of software applications on the mobile device. A predetermined set of applications that control basic operations, including data and voice communication applications for example, may be installed on mobile device 500 during manufacturing. One software application may be a personal information manager (PIM) application having the ability to organize and manage data items relating to the user of the mobile device such as, but not limited to, e-mail, calendar events, voice mails, appointments, and task items. Other applications may include multimedia application, social networking applications, instant messaging application, among others.

In a data communication mode, a received signal such as a text message or web page download may be processed by the communication subsystem 511 and input to the microprocessor 538, which may further process the received signal for output to the display 522, or alternatively to an auxiliary I/O device 528. A user of mobile device 500 may also compose data items such as email messages for example, using the keyboard 532, which in one embodiment is a complete alphanumeric keyboard or telephone-type keypad, in conjunction with the display 522 and possibly an auxiliary I/O device 528. Such composed items may then be transmitted over a communication network through the communication subsystem 511.

For voice communications, overall operation of mobile device 500 is similar; except that received signals would typically be output to a speaker 534 and signals for transmission would be generated by a microphone 536. Alternative voice or audio I/O subsystems, such as a voice message recording subsystem, may also be implemented on mobile device 500. Although voice or audio signal output is generally accomplished primarily through the speaker 534, display 522 may also be used to provide an indication of the identity of a calling party, the duration of a voice call, or other voice call related information for example.

Serial port 530 in FIG. 5 would normally be implemented in a personal digital assistant (PDA)-type mobile device for which synchronization with a user's desktop computer (not shown) may be desirable. Such a port 530 would enable a user to set preferences through an external device or software application and would extend the capabilities of mobile device 500 by providing for information or software downloads to mobile device 500 other than through a wireless communication network. The alternate download path may for example be used to load an encryption key onto the device through a direct and thus reliable and trusted connection to thereby enable secure device communication.

Alternatively, serial port 530 could be used for other communications, and could include as a universal serial bus (USB) port. An interface is associated with serial port 530.

Other communications subsystems 540, such as a short-range communications subsystem, is a further optional component which may provide for communication between mobile device 500 and different systems or devices, which need not necessarily be similar devices. For example, the subsystem 540 may include an infrared device and associated circuits and components or a Bluetooth™ communication module to provide for communication with similarly enabled systems and devices.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method at a wireless device comprising:
   determining a set of required services for the wireless device, such services requiring a radio connection over at least one radio access technology (RAT);
   selecting a first RAT from a plurality of radio access technologies (RATs), the plurality of RATs being provided by a plurality of radio access networks;
   determining that not every service from the set of required services is available over the first RAT;
   performing, until the set of required services is available over selected RATs, the steps of:
      determining that a next RAT from the plurality of RATs offers services that are not available over selected RATs;
      selecting the next RAT; and
      determining whether the set of required services are available over selected RATs; and
   when the set of required services is available over the selected RATs, monitoring only the selected RATs when the wireless device is in idle mode, the monitoring comprising, for unselected RATS of the plurality of RATs:
   deactivating monitoring; or
   reducing a monitoring frequency.

2. The method of claim 1, wherein the required services are defined by a user, carrier, or manufacturer of the wireless device.

3. The method of claim 1, wherein the required services vary based on time of day.

4. The method of claim 1, wherein the required services vary based on a selected profile.

5. The method of claim 1, wherein the performing utilizes a prioritized list of possible radio access technologies.

6. The method of claim 1, wherein the radio access technologies use both licensed and unlicensed spectrum.

7. The method of claim 6, wherein the radio access technology using licensed spectrum includes one or more of global system for mobile communications, code division multiple access, universal mobile telecommunications standard, long term evolution, and long term evolution advanced.

8. The method of claim 6, wherein the radio access technology using unlicensed spectrum includes at least one of WiFi, WiMAX, or Bluetooth™.

9. The method of claim 1, wherein determining whether the set of required services are available over the at least one RAT is based on a dynamic query of the at least one RAT.

10. A wireless device, comprising:
    a processor; and
    a communications subsystem;
    wherein the wireless device is configured to:
       determine a set of required services for the wireless device, such services requiring a radio connection over at least one radio access technology (RAT);
       select a first RAT from a plurality of radio access technologies (RATs), the plurality of RATs being provided by a plurality of radio access networks;
       determine that not every service from the set of required services is available over the first RAT;
       perform, until the set of required services is available over selected RATs, the steps of:
          determining that a next RAT from the plurality of RATs offers service that are not available from selected RATs;
          selecting the next RAT; and
          determining whether the set of required services are available over selected RATs; and
       when the set of required services is available over the selected RATs, monitor only the selected RATs when the wireless device is in idle mode, the monitoring comprising, for unselected RATs of the plurality of RATs:
       deactivating monitoring; or
       reducing a monitoring frequency.

11. The wireless device of claim 10, wherein the required services are defined by a user, carrier, or manufacturer of the wireless device.

12. The wireless device of claim 10, wherein the required services vary based on time of day.

13. The wireless device of claim 10, wherein the required services vary based on a selected profile.

14. The wireless device of claim 10, wherein the wireless device is configured to perform the selecting the first RAT and the selecting the next RAT by using a prioritized list of possible radio access technologies.

15. The wireless device of claim 10, wherein the radio access technologies use both licensed and unlicensed spectrum.

16. The wireless device of claim 15, wherein the radio access technology using licensed spectrum includes one or more of global system for mobile communications, code division multiple access, universal mobile telecommunications standard, long term evolution, and long term evolution advanced.

17. The wireless device of claim 15, wherein the radio access technology using unlicensed spectrum includes at least one of WiFi, WiMAX, or Bluetooth™.

18. The wireless device of claim 10, wherein the wireless device is configured to determine whether the set of required services are available over the at least one RAT based on a dynamic query of the at least one RAT.

* * * * *